3,020,296
PREPARATION OF ESTRADIOL AND INTERMEDIATES THEREOF
Garard Nomine, Noisy-le-Sec, Daniel Bertin, Montrouge, and Jean Tessier, Paris, France, assignors to Les Laboratoires Francais de Chimiotherapie, Paris, France, a corporation of France
No Drawing. Filed Oct. 25, 1960, Ser. No. 64,733
Claims priority, application France Nov. 6, 1959
5 Claims. (Cl. 260—397.45)

The present invention relates to a novel process for the preparation of estradiol, one of the well-known sex hormones. The invention further relates to novel intermediates, namely, 17β-acyloxy-19-nor-Δ$^{8(9)}$-androstene-5-ol-3-one compounds of the formula:

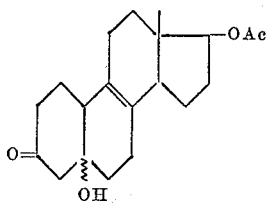

wherein Ac is the acyl radical of an organic carboxylic acid of 1 to 18 carbon atoms, and the two 5 epimers thereof.

An object of the invention is to obtain estradiol by a novel sequence of simple steps.

A further object of the invention is the production of the novel intermediates for estradiol, namely, 17β-acyloxy-19-nor-Δ$^{8(9)}$-androstene - 5 - ol-3-one and 19-nor-Δ$^{4,9(10)}$-androstadiene-17β-ol-3-one.

These and other objects and advantages will become more obvious from the following detailed description.

The process of the present invention comprises condensing Δ$^{9(10)}$-3-methyl - 7 - oxo-3,4-[3'-acyloxy cyclopentano(2',1')]octahydronaphthalenes of the formula:

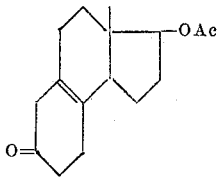

wherein Ac has the above designation, with methyl vinyl ketone to form 17β-acyloxy-19-nor-Δ$^{8(9)}$-androstene-5-ol-3-one, dehydrating and simultaneously saponifying the latter product to form 19-nor-Δ$^{4,9(10)}$-androstadiene-17β-ol-3-one which is isomerized to estradiol. The reaction scheme of the invention is shown in Table I.

TABLE I

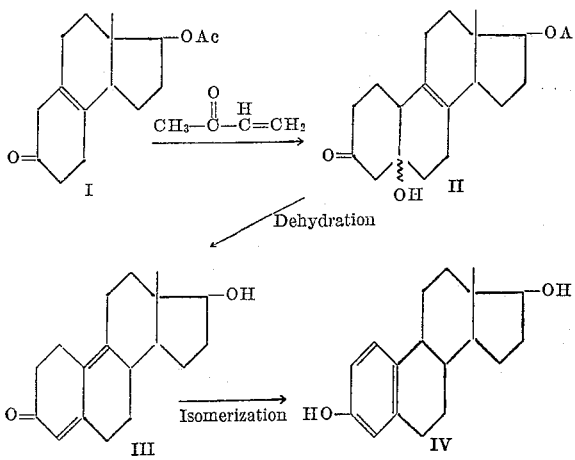

The condensation step is effected at normal temperatures in a weakly alkaline medium with the aid of a condensing agent in the presence of an inert solvent. Preferred condensing agents are the alkali metal and alkaline earth metal salts of barbiturates. The barbiturates may be barbituric acid or substituted barbituric acids such as 5-ethyl-5-isoamyl arbituric acid, 5-butyl-5-ethyl barbituric acid, 5,5-diethyl barbituric acid, 5-ethyl-5-(1-methyl butyl) barbituric acid and 5-ethyl-5-phenyl barbituric acid. Suitable inert solvents are lower alkanols such as ethanol.

The dehydration is effected at reflux temperatures in the presence of an alkali metal or alkaline earth metal alcoholates in an inert solvent such as ethanol. Preferred alcoholates are sodium and potassium derivatives of lower aliphatic alcohols such as methanol, ethanol, propanol and butanol.

The isomerization step is effected by heating 19-nor-Δ$^{4,9(10)}$-androstadiene-17β-ol - 3 - one at elevated temperatures of the order of 150° to 200° C. in the presence of a suitable isomerization catalyst. A preferred catalyst is palladized carbon black.

The starting materials for the process of the invention may be prepared by the process described in the copending, commonly assigned United States patent application Serial No. 6,111, filed February 2, 1960. The said process comprises hydrolyzing Δ$^{(6,7),(9,10)}$ - 3 - methyl-7-methoxy - 3,4 - [3' - benzoyloxy cyclopentano(2',1')]-hexahydronaphthalenes under acidic conditions.

The acyl radical of the compounds of the invention is the acyl radical of organic carboxylic acid having 1 to 18 carbon atoms. Suitable carboxylic caids are the alkanoic and alkenoic acids such as acetic acid, trimethyl acetic acid, propionic acid, 4,4-dimethyl pentanoic acid, 10-undecanoic acid; cycloalkyl alkanoic acids such as β-cyclopentyl propionic acid; arylalkanoic acids such as phenylpropionic acid; cycloalkyl acids such as hexahydrobenzoic acid and hexahydro-terephthalic acid; and phenylcarboxylic acids such as benzoic acid or 3,5-dinitrobenzoic acid.

In the following examples there are described several preferred embodiments to illustrate the invention. However, it should be understood that the invention is not intended to be limited to the specific embodiments. The melting points are the instantaneous melting points determined on the Maquenne block.

*Example 1.—Preparation of the 17β-benzoyloxy 19-nor Δ$^{8(9)}$-androstene-5-ol-3-one and separation of the two 5 epimers*

1 gram of Δ$^{9,10}$ 3-methyl 7-oxo 3,4[3'-benzoyloxy cyclopentano (2',1')] octahydronaphthalene, melting point 127° C., obtained by hydrolysis of the Δ$^{(6,7)(9,10)}$ 3-methyl-7-methoxy-3,4-[3'-benzoyloxy cyclopentano (2', 1')] hexahydronaphthalene with oxalic acid, according to the process described in copending, commonly assigned United States patent application Serial No. 6,111, filed February 2, 1960, was introduced into 2.5 cc. of ethanol. After five minutes of agitation 0.054 gm. of methylvinyl ketone in 0.5 cc. of ethanol were added. Then 0.04 gm. of sodium salt of 5-ethyl-5-isoamyl barbituric acid in 1 cc. of ethanol containing 30% water were added. The reaction mixture was agitated for two hours in an atmosphere of nitrogen and there was added in small amounts 3.2 cc. of an ethanolic solution of methylvinylketone having the same concentration as that above.

The reaction mixture was then alkalized with 1 cc. of a 0.1 N aqueous potassium hydroxide solution, and crystallization was started by scratching and addition of water. After allowing the mixture to stand for 72 hours at room temperature, the precipitate was vacuum filtered and recrystallized from ethanol, then from isopropyl ether. The crystals were dried and 460 mg. of white crystals were recovered constituting a mixture of the two 5-epimers of 17β-benzoyloxy-19-nor-Δ$^{8(9)}$-androstene-5-ol-3-one, II (wherein Ac=C$_6$H$_5$CO), having a melting point of 220–222° C.

The two epimers were separated by solution in hot acetic acid. The first product which crystallized and which was called epimer A, had a melting point of 247°–249° C., and was present in the form of white hexagonal plates poorly soluble in methanol, very poorly soluble in isopropyl ether, soluble in hot ethanol and insoluble in water and dilute aqueous acids or alkalis. The second product which crystallized from the mother liquor after standing for 24 hours, and which was called epimer B, had a melting point of 247°–249° C., and was present in the form of white prisms, soluble in hot alcohol and hot acetic acid. The melting point of the mixture of epimer A and epimer B was about 235–237° C.

*Example 2.—Preparation of estradiol from Compound II, Ac=C$_6$H$_5$CO*

(a) *Dehydration.*—140 mg. of Compound II,

Ac=C$_6$H$_5$CO constituting a mixture of the two 5 epimers, were introduced in 12 cc. of a sodium ethylate solution containing 1.2 gm. of sodium in 50 cc. of ethanol. The reaction mixture was heated to reflux in a nitrogen atmosphere for 5 minutes, cooled, then 1 cc. of acetic acid was added. The reaction mixture was turned into water and extracted with ether. The extracts were combined, washed with water, with sodium bicarbonate, and again with water, dried, and evaporated to dryness under vacuum to furnish a residue of 98.2 mg. of 19-nor-Δ$^{4,9(10)}$-androstadiene-17β-ol-3-one (Compound II, Ac=C$_6$H$_5$CO). The product was purified by chromatography on silicagel and eluted with methylene chloride containing 16% acetone. The product had a melting point of 168.5–169.5° C. and and an ultra-violet spectra λ$_{max}$=304 mμ, ε=19,800, inflexion 238 mμ, ε=4,700. This product occurred in the form of white prisms soluble in cold alcohol, acetic acid and acetone, soluble in hot isopropyl ether and insoluble in water and dilute aqueous acids and alkalis.

*Analysis.*—C$_{18}$H$_{24}$O$_2$; molucular weight=272.4. Calculated: C, 79.36%; H, 8.88%. Found: C, 79.5%; H, 8.7%.

This product is not described in the literature.

(b) *Isomerization.*—Into a 1 cc. ampoule were introduced 1.43 mg. of 19-nor-Δ$^{4,9(10)}$-androstadiene-17β-ol-3-one, 5 mg. of palladized carbon black containing 10% palladium and 0.2 cc. of p-cymene, previously boiled in the presence of several mg. of palladized carbon black. The ampoule was sealed under vacuum and heated to 170–180° C. under agitation for 2½ hours. After cooling, the ampoule was broken and the contents added to ether. The suspension was filtered and the ethereal solution was evaporated to dryness under vacuum. The residue was raw racemic estradiol which can be identified by chromatography on paper and by its usual color reactions.

Various modifications of the process and the products of the present invention may be made without departing from the spirit or scope thereof, and it is to be understood that the invention is limited only as defined in the appended claims.

We claim:

1. A process for the preparation of estradiol which comprises condensing Δ$^{9(10)}$ - 3 - methyl-7-oxo-3,4[3′-acyloxy-cyclopentano (2′,1′)] octahydronapthalenes of the formula

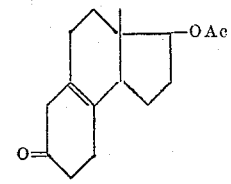

wherein Ac is the acyl radical of an organic carboxylic acid having 1 to 18 carbon atoms with methylvinyl ketone to form 17β-acyloxy-19-nor-Δ$^{8(9)}$-androstene-5-ol-3-ones of the formula

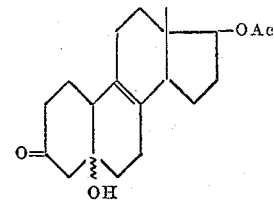

wherein Ac has the above definition, dehydrating the latter in the presence of an alkaline alcoholate to form 19-nor-Δ$^{4,9(10)}$-androstadiene-17β-ol-3-one and isomerizing said dehydrated compound in the presence of palladized carbon black to estradiol.

2. The process of claim 1 wherein the condensation is carried on in the presence of sodium derivatives of barbiturates.

3. A process for the preparation of estradiol which comprises condensing Δ$^{9(10)}$-3-methyl-7-oxo-3,4-[3′-benzoyloxy cyclopentano (2′,1′)]octahydronaphthalene with methylvinyl ketone in the presence of a sodium derivative of the barbiturates to form 17β-benzoyloxy-19-nor-Δ$^{8(9)}$-androstene-5-ol-3-one, dehydrating the latter in the presence of an alkaline alcoholate to form 19-nor-Δ$^{4,9(10)}$-androstadiene-17β-ol-3-one and isomerizing said dehydrated compound in the presence of palladized carbon black to estradiol.

4. A compound of the formula

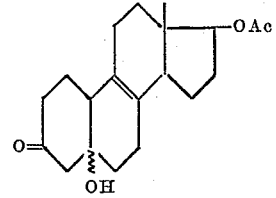

wherein Ac is the acyl radical of an organic carboxylic acid having 1 to 18 carbon atoms.

5. 17β-benzoxy - 19 - nor-Δ$^{8(9)}$-androstene-5-ol-3-one.

No references cited.